United States Patent [19]
Hsieh et al.

[11] Patent Number: 6,006,283
[45] Date of Patent: Dec. 21, 1999

[54] SYSTEM AND METHOD FOR MANAGING INFORMATION EXCHANGES IN A DISK INTERFACE CHIP

[75] Inventors: Elaine Hsieh, Santa Clara; Darren Jones, Mountain View, both of Calif.

[73] Assignee: LSI Logic Corporation, Milpitas, Calif.

[21] Appl. No.: 09/021,356

[22] Filed: Feb. 10, 1998

[51] Int. Cl.[6] ..................................................... G06F 13/00
[52] U.S. Cl. ................................ 710/9; 710/129; 709/250
[58] Field of Search ..................................... 370/386–401; 709/250; 710/1–10, 36–45, 129–131

[56] References Cited

U.S. PATENT DOCUMENTS

| | | | |
|---|---|---|---|
| 5,566,171 | 10/1996 | Levinson ................................. | 370/60.1 |
| 5,623,640 | 4/1997 | Nakabo ..................................... | 74/170 |
| 5,845,149 | 12/1998 | Husted et al. ............................. | 710/9 |
| 5,887,144 | 3/1999 | Guthrie et al. ........................... | 710/101 |
| 5,903,571 | 5/1999 | Koepper et al. ......................... | 370/524 |
| 5,905,781 | 5/1999 | McHale et al. ....................... | 379/93.14 |
| 5,930,255 | 7/1999 | Tsukamoto et al. .................... | 370/397 |

*Primary Examiner*—Christopher B. Shin
*Attorney, Agent, or Firm*—Conley, Rose & Tayon, PC; B. Noel Kivlin

[57] ABSTRACT

A serial network interface unit which uses indirect addressing to access an exchange table. In one embodiment, the serial network interface unit comprises a serial communications transceiver, a transmit controller, a receive controller, and a register file for storing an exchange table and an index table. The exchange table has slots for storing information about data exchanges, and the index table has an entry for each ongoing exchange to indicate which of the slots is storing information about the exchange. The transmit and receive controllers are coupled to the register file to reference the index table to determine an exchange table slot corresponding to a current exchange and to thereafter update information in the current exchange table slot. A processor may be coupled to the register file via an i/o bus to store inactive (but ongoing) data exchange information to system memory and to replace the inactive data exchange information with information for active data exchanges. The processor also updates the index file to reflect these changes. When an inactive exchange becomes active again, it is placed back into the exchange table for access by the receive and transmit controllers.

12 Claims, 3 Drawing Sheets

SYSTEM AND METHOD FOR MANAGING INFORMATION EXCHANGES IN A DISK INTERFACE CHIP

BACKGROUND OF THE INVENTION

1. Field of the Invention

This invention relates to the field of computer networking, and in particular to a low complexity information exchange management system.

2. Description of the Related Art

Internetworking of high-performance computers has become the focus of much attention in the data communications industry. Performance improvements in processors and peripherals, along with the move to distributed architectures such as client/server, have spawned increasingly data-intensive and high-speed networking applications, such as medical imaging, multimedia, and scientific visualization. However, the interconnections between the systems and their input/output devices cannot keep up with the blinding data rates, nor can they provide the distances needed for local area networks spanning campus-wide areas.

According to "Amdahl's Law", a megabit per second of input/output (I/O) capability is needed for every MIPS of processor performance. Current communications standards top out at just over 100 megabits per second, not nearly fast enough, as technical computing applications already demand processors exceeding 1,000 MIPS. The deficiencies in current transmission rates results in the communications channel becoming a bottleneck to system performance.

A new protocol known as Fibre Channel is 10 to 250 times faster than existing networks, transmitting at rates exceeding 1 Gbps in both directions simultaneously. It defines standard media and signaling conventions for transporting data in a serial fashion, it provides an error correcting channel code and a frame structure for transporting the data, it sets out a flow control methodology, creates some common services, and supports interfaces to existing higher level protocols such as SCSI (small computer system interface). The Fibre Channel protocol can be applied to various network topologies including point-to-point, ring, and switched. The Fibre Channel protocol is being proposed as an ANSI (American National Standards Institute, Inc.) standard, and a multitude of reference material is readily available at http://www.fibrechannel.com.

The higher level protocols supported by Fibre Channel perform "operations" such as: open, read, write, close, etc. Each of these operations corresponds to one or more data exchanges between the local node and a remote node. It is desirable to allow a large number of exchanges to be concurrently active on a given node, since this permits "multitasking" by a node. When a node is waiting on a resource (e.g. waiting for data on a disk to be read into memory) it could simultaneously be fulfilling other requests (e.g. buffering data to be written to disk, sending data already in cache memory to another remote node).

The high data rates require that a large part of the Fibre Channel protocol be handled by hardware. The hardware implementation may incur unwanted cost and complexity, particularly if a large number of concurrent data exchanges are to be supported. Each data exchange must be tracked by the network interface so that the interface can commence, conduct, and conclude each exchange in an orderly fashion, conforming to the specified exchange flow and verifying the validity of each received data frame. The tracking information for each exchange is stored in a corresponding entry in an exchange table. It would be desirable to provide a method for supporting a large number of concurrent data exchanges while maintaining a small exchange table.

SUMMARY OF THE INVENTION

The problems outlined above are in large part solved by a serial network interface unit which uses indirect addressing to access an exchange table. In one embodiment, the serial network interface unit comprises a serial communications transceiver, a transmit controller, a receive controller, and a register file for storing an exchange table and an index table. The exchange table has slots for storing information about data exchanges, and the index table has an entry for each ongoing exchange to indicate which of the slots is storing information about the exchange. The transmit and receive controllers are coupled to the register file to reference the index table to determine an exchange table slot corresponding to a current exchange and to thereafter update information in the current exchange table slot. A processor may be coupled to the register file via an i/o bus to store inactive (but ongoing) data exchange information to system memory and to replace the inactive data exchange information with information for active data exchanges. The processor also updates the index file to reflect these changes. When an inactive exchange becomes active again, it is placed back into the exchange table for access by the receive and transmit controllers.

Broadly speaking, the present invention contemplates a method for managing concurrent data exchanges between a local node and one or more remote nodes coupled to the local node by a serial communications link. The method comprises: (1) prioritizing concurrent data exchanges to determine a set of active data exchanges; (2) assigning a slot in an exchange table to each active data exchange; (3) updating index table entries corresponding to the active data exchanges with respective exchange table slots; (4) storing information about the active exchanges in the exchange table slots; (5) receiving an incoming data frame; (6) referencing the index table to determine a current exchange table slot for the incoming data frame; (7) verifying the validity of the incoming data frame using the information in the current exchange table slot; and (8) updating the information in the current exchange table slot if the incoming data frame is valid.

BRIEF DESCRIPTION OF THE DRAWINGS

Other objects and advantages of the invention will become apparent upon reading the following detailed description and upon reference to the accompanying drawings in which.

Figure 1:
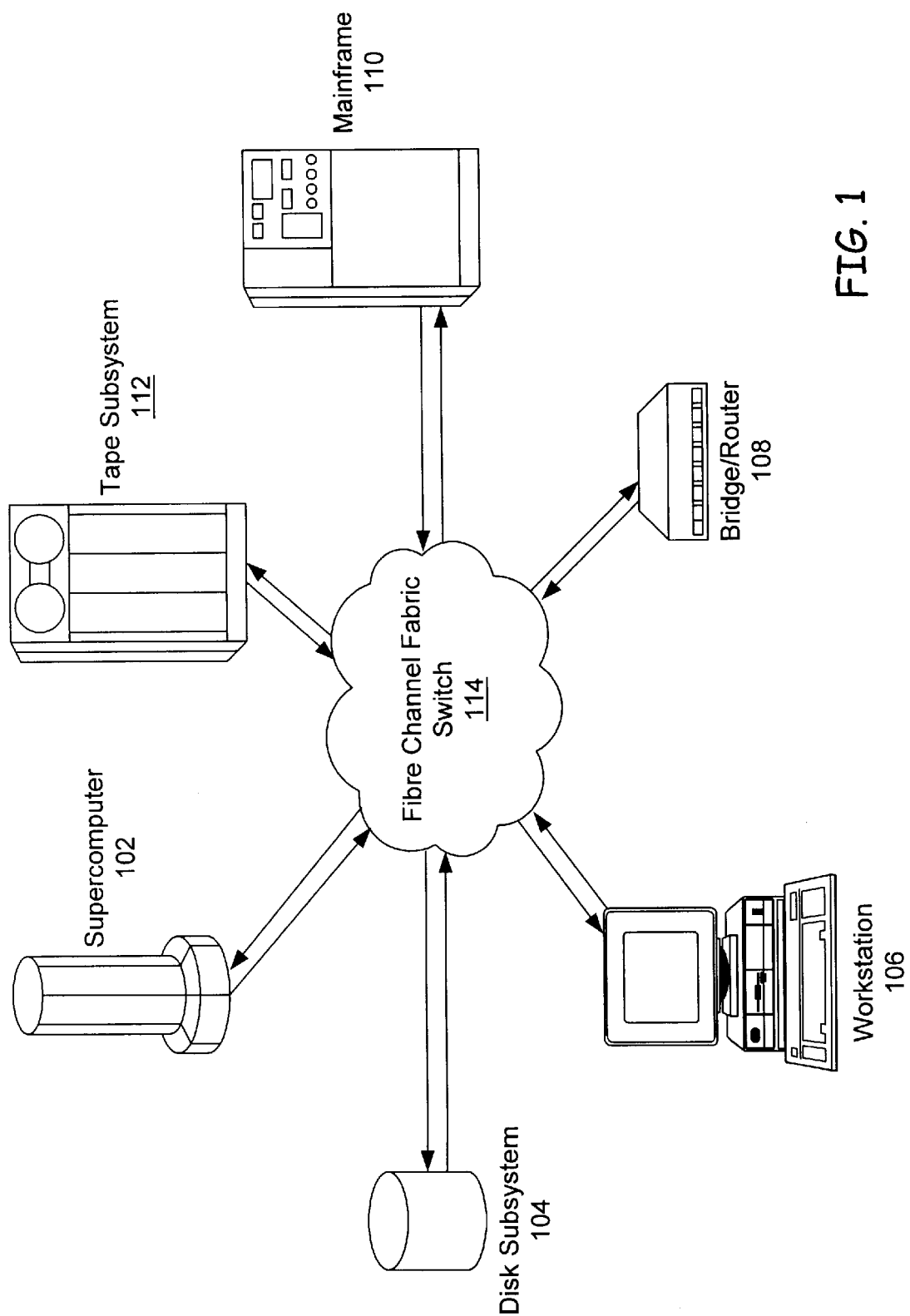
FIG. 1 shows a system network with exemplary nodes coupled via serial links.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to the figures, FIG. 1 illustrates an exemplary system network having as nodes a supercomputer 102, a disk subsystem 104, a workstation 106, a bridge/router 108, a mainframe 110, and a tape subsystem 112. Each of the nodes is coupled to a central "fabric switch" 114 by a serial link having a receive channel and a transmit channel. The fabric switch 114 is shown nebulously since the exact network topology is unimportant to the present disclosure. It is sufficient to stipulate that the fabric switch 114 transports data frames and control words from the transmit channel of a source node to the receive channel of a destination node. The number and routing of concurrent connections is determined by the fabric switch.

Figure 2:
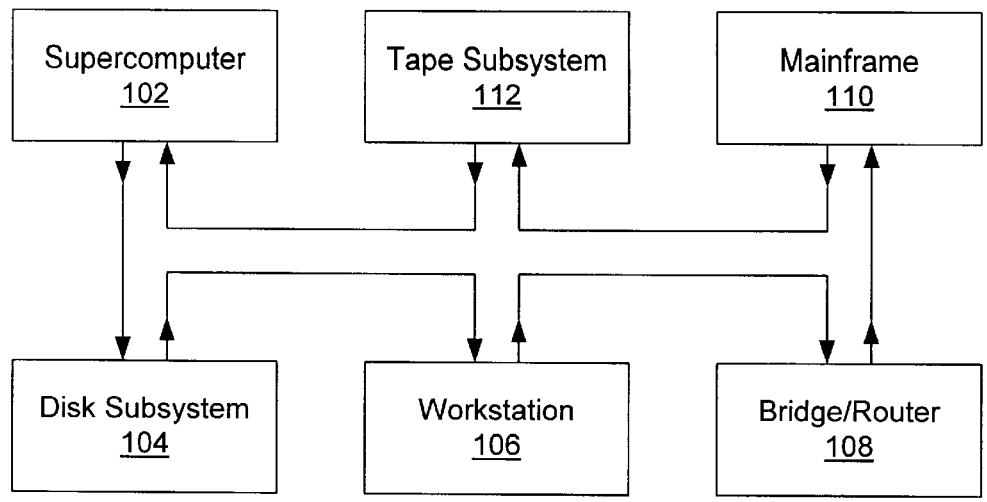
FIG. 2 shows a system network configured as an arbitrated loop.

One specific fabric switch embodiment is illustrated in FIG. 2. The nodes are coupled in an "arbitrated loop" topology, in which the transmit channel from one node is directly connected to the receive channel of the next node. In this topology, only one initiator-responder connection is supported at a time, with the rest of the nodes simply "passing along" anything they receive. Using control words, an initiating node first arbitrates to get control of the loop, then notifies a responding node of its desire to transmit data frames. The initiating and responding node negotiate a mutually agreeable frame size, then the responding node provides a buffer credit to the initiating node for each data frame it has space to accommodate. Upon receipt of the buffer credits, the initiating node begins transmitting data frames, one per credit, until the data has been sent.

The data frames moving between the initiating and responding node are organized in the following manner. Consecutive frames moving in the same direction form a sequence. A series of related sequences (in both directions) forms an exchange. Any given node may be participating in multiple concurrent exchanges, so a network interface unit receiving data frames must determine which exchange each data frame belongs to in order to track the progress of each exchange. Each data frame includes a frame header having (among other items) the following information: the physical address of the destination (PA), the exchange identifier used by the initiator (OX_ID), the exchange identifier used by the responder (RX_ID), a sequence identifier (SEQ_ID), a frame number within the sequence (SEQ_CNT), and a frame control field having a first_sequence flag and a last_sequence flag.

Figure 3:
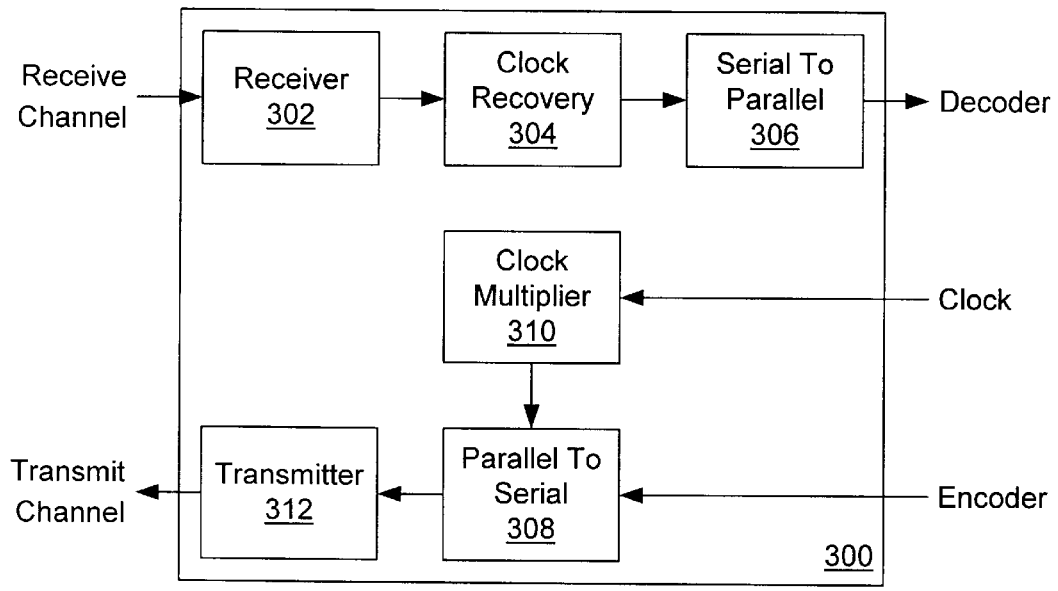
FIG. 3 shows a serial communication transceiver.

FIG. 3 illustrates a serial communication transceiver 300 which may be used by the nodes to couple to the serial communications link. Transceiver 300 includes a receiver 302 coupled to the receive channel to sense incoming signal levels, clean them up as much as possible, and provide them to a clock recovery module 304. Clock recovery module 304 uses the incoming signal to reconstruct a clock signal synchronized to the incoming data, and a serial-to-parallel converter 306 uses the reconstructed clock signal to convert the incoming signal from serial form to parallel form. In one embodiment, converter 306 outputs one 10-bit channel codeword at a time. The output from the converter 306 is sent to a decoder.

Transceiver 300 also includes a parallel-to-serial converter 308 which receives a stream of codewords from an encoder and uses a clock signal from clock multiplier 310 to convert the stream of codewords into a serial bitstream. Transmitter 312 then converts the serial bitstream into signals suitable for transport by the transmit channel. Transceiver 300 is typically provided on a network card which resides on the i/o bus of a node. The interface between the transceiver 300 and the i/o bus is provided by a network interface unit such as that shown in FIG. 4.

Figure 4:
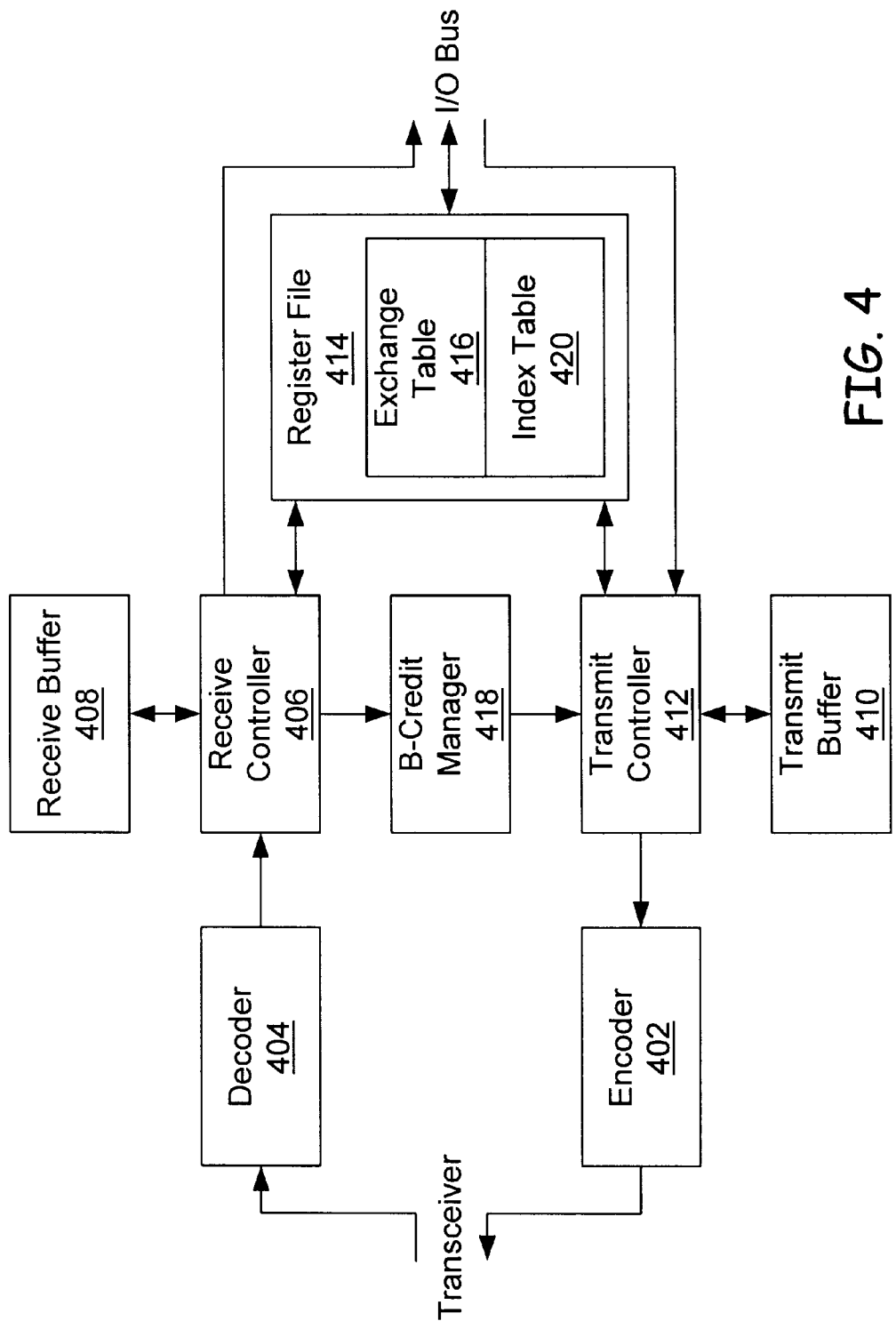
FIG. 4 shows a network interface unit which uses indirect addressing to access an exchange table.

One embodiment of a network interface unit is provided in FIG. 4. It includes an encoder 402 and a decoder 404 coupled to the transceiver 300. Encoder 402 and decoder 404 provide error correction coding and decoding for information transmitted across the serial link. Decoded data from decoder 404 is provided to receive controller 406. Receive controller stores received control words and data frames in receive buffer 408. If the node is in a "pass along" mode, the receive buffer 408 is also used as a transmit buffer 410. A transmit controller 412 retrieves control words and data frames from transmit buffer 410 and forwards them to encoder 402. If the node is transmitting or receiving data (i.e. participating in an exchange of data), receive controller 408 updates exchange information in register file 414 in response to received control words or data frames, and forwards data from received data frames to the node's i/o bus. Transmit controller 412 updates exchange information in register file 414 in response to commands and data from the node's i/o bus, generates control words and data frames in transmit buffer 410, and forwards them to encoder 402.

A processor at the local node may have access to register file 414 via the i/o bus. In one embodiment, the management of the network interface is done via a software driver resident in system memory. In this case, the incoming data and outgoing data may be written to and read from system memory via DMA (direct memory access) channels. The software driver determines when a data exchange is initiated or concluded, and maintains a list of concurrent data exchanges. Although there is no specified limit to the number of concurrent exchanges, it is likely that only a small number will be active (i.e. expecting that data frames for these exchanges will be sent or received in, say, the next 100 microseconds) at any given time. The processor stores tracking information for the active exchanges in an exchange table 416 in register file 414. To allow the receive and transmit controllers to quickly update the exchange tracking information, the processor also provides an index table 420 in register file 414. The index table 420 has an entry corresponding to each possible exchange number, and the value of the entries corresponding to active exchanges is set equal to the location of the tracking information in the exchange table 416. The receive or transmit controller needing to access or update the exchange table information can then first retrieve the exchange number from the frame header, reference the index table using this exchange number to determine the location of the tracking information in the exchange table, and then access or update the tracking information using the location provided. This advantageously provides a way for a large number of concurrent data exchanges to be efficiently supported using an exchange table of limited size. During its pendency, a data exchange may have its tracking information moved to and from system memory multiple times, and each time the exchange table slot the information gets stored in may change. The controllers 406, 412 are able to track the changing exchange table slot since the location is updated in the index table every time the exchange changes from inactive to active.

Various methods for determining which of the concurrent exchanges are active may be used. The likelihood of processing frames may not be the only factor. Other factors may include node or task priority, predicted response time for data frames of an exchange, and limitations on numbers of simultaneously active exchanges of certain exchange types. If data frames for inactive data exchanges are received, the controllers will be unable to find the tracking information, and the frames may be rejected or replied to with a "Busy" control word so that the transmitting node is prompted to re-send the frame at a later time. Alternatively, the software driver may impose limitations on the concurrent exchanges to ensure that data frames for inactive exchanges are never processed, i.e. that the tracking information is always available for data frames being processed.

Also shown in FIG. 4 is a buffer-credit manager 418. As described previously, before an initiating node can transmit a data frame to a responding node, it must first secure a buffer credit from that node. Consequently, when receive controller 406 receives a control word indicating that a remote node wishes to transmit data, the buffer credit manager 418 is enabled, and the transmit controller 412 begins transmitting buffer credit control words in response to a credit signal from buffer credit manager 418. At the beginning of an exchange, the receive buffer 408 is empty of data frames, and the buffer credit manager 418 is provided with the negotiated frame size and the receive buffer capacity, and it is expected to generate and manage a number of buffer credits equal to the receive buffer capacity divided by the frame size, with as little delay as possible.

Numerous variations and modifications will become apparent to those skilled in the art once the above disclosure is fully appreciated. It is intended that the following claims be interpreted to embrace all such variations and modifications.

What is claimed is:

1. A disk interface unit which comprises:

a register file for storing an exchange table and an index table, wherein the exchange table has a predetermined number of slots for storing information about an exchange, and wherein the index table has an entry for each ongoing exchange to indicate which of the predetermined number of slots is storing information about the exchange;

a serial communications transceiver for driving transmit signals on a serial communications link and for buffering receive signals on the serial communications link;

a transmit controller coupled to provide the transmit signal to the serial communications transceiver; and a receive controller coupled to receive the receive signal from the serial communications transceiver, wherein the transmit and receive controllers are coupled to the register file to reference the index table to determine a current exchange table slot corresponding to a current exchange and thereby update information in the current exchange table slot.

2. The disk interface unit of claim 1, wherein the receive controller is further configured to use the information in the current exchange table slot to verify that data frames in the receive signal are valid.

3. The disk interface unit of claim 1, wherein the information in the current exchange table slot includes a sequence identification number and a frame count to indicate identifying characteristics of a most recently processed data frame.

4. The disk interface unit of claim 3, wherein the receive controller is further configured to compare information from an incoming data frame header with the sequence identification number and frame count stored in the current exchange table slot to verify that the incoming data frame is valid.

5. The disk interface unit of claim 4, wherein the receive controller is further configured to store the sequence identification number and frame count of the incoming data frame in the current exchange table slot if the incoming data frame is valid.

6. The disk interface unit of claim 1, wherein the information in the current exchange table slot includes an address of a remote node participating in the current exchange.

7. The disk interface unit of claim 1, wherein a processor is coupled to the register file via a local i/o bus, wherein the processor is configured to support a number of concurrent exchanges, wherein the number of concurrent exchanges is greater than the predetermined number of slots in the exchange table, and wherein the processor is configured to free exchange table slots corresponding to ongoing exchanges which are inactive for a predetermined time.

8. The disk interface unit of claim 1, wherein a processor is coupled to the register file to prioritize ongoing exchanges according to factors including type of exchange and availability of data, wherein the processor assigns exchange table slots to highest priority exchanges and updates the index table accordingly.

9. A method for managing concurrent data exchanges between a local node and one or more remote nodes coupled to the local node by a serial communications link, wherein the method comprises:

prioritizing concurrent data exchanges to determine a set of active data exchanges;

assigning a slot in an exchange table to each active data exchange;

updating index table entries corresponding to the active data exchanges with respective exchange table slots;

storing information about the active exchanges in the exchange table slots;

receiving an incoming data frame;

referencing the index table to determine a current exchange table slot for the incoming data frame;

verifying the validity of the incoming data frame using the information in the current exchange table slot;

updating the information in the current exchange table slot if the incoming data frame is valid.

10. The method of claim 9, further comprising:

periodically reviewing concurrent data exchanges to remove concluded exchanges, reprioritize remaining data exchanges, and re-determine a set of active data exchanges;

assigning a slot in the exchange table to each active data exchange not already having a slot; and updating index table entries corresponding to active data exchanges with newly assigned exchange table slots.

11. The method of claim 10, wherein the updating of index table entries includes assigning null values to index table entries corresponding to inactive data exchanges.

12. The method of claim 9, further comprising:

transmitting an outgoing data frame;

referencing the index table to determine a current exchange table slot for the outgoing data frame;

updating the information in the current exchange table slot to reflect the transmission of the outgoing data frame.

* * * * *